Oct. 11, 1949.  C. GROSSI  2,484,452
ANIMAL TRAP
Filed Feb. 28, 1945  2 Sheets-Sheet 1

INVENTOR.
Carlo Grossi,
BY
Hull West
ATTORNEYS

Oct. 11, 1949.  C. GROSSI  2,484,452
ANIMAL TRAP
Filed Feb. 28, 1945  2 Sheets-Sheet 2

INVENTOR.
Carlo Grossi,
BY Hull West,
ATTORNEYS

Patented Oct. 11, 1949

2,484,452

UNITED STATES PATENT OFFICE 2,484,452

ANIMAL TRAP

Carlo Grossi, Cleveland, Ohio, assignor to Edward Stokes Coughanor

Application February 28, 1945, Serial No. 580,157

6 Claims. (Cl. 43—76)

1

This invention relates to animal traps, and more particularly to rat traps of the type which are provided with a bait chamber, access to which is obtained through a door held in open position by a tiltable platform which, when tilted in the appropriate direction by the weight of the rat, will result in closing the door and in providing an escape for the rat only by means of an upright tubular passageway, the outlet of which is arranged in operative relation to a tiltable platform which serves, by the weight of the rat imposed thereupon, to deliver the rat into a receptacle containing water in which it is drowned, and which also serves to re-set the trap for the entrance of the succeeding rat.

It is an object of my invention to provide traps of this character with means whereby, when the first tiltable platform is operated by the weight of the rat, it will effectually close off the bait chamber while simultaneously opening an escape for the rat through the tubular passageway; also to provide traps of this character with improved means for operating the entrance doors by the operation of the second platform; also to provide the second platform with cooperating means whereby the rat or other animal will be prevented from retreating into the aforesaid passageway after he shall have advanced along the second platform a distance sufficient to cause the latter to be tilted into a dumping position.

Figure 1:
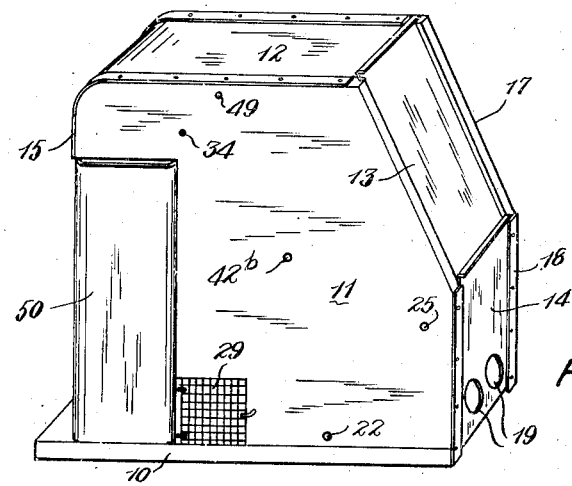
Figure 2:
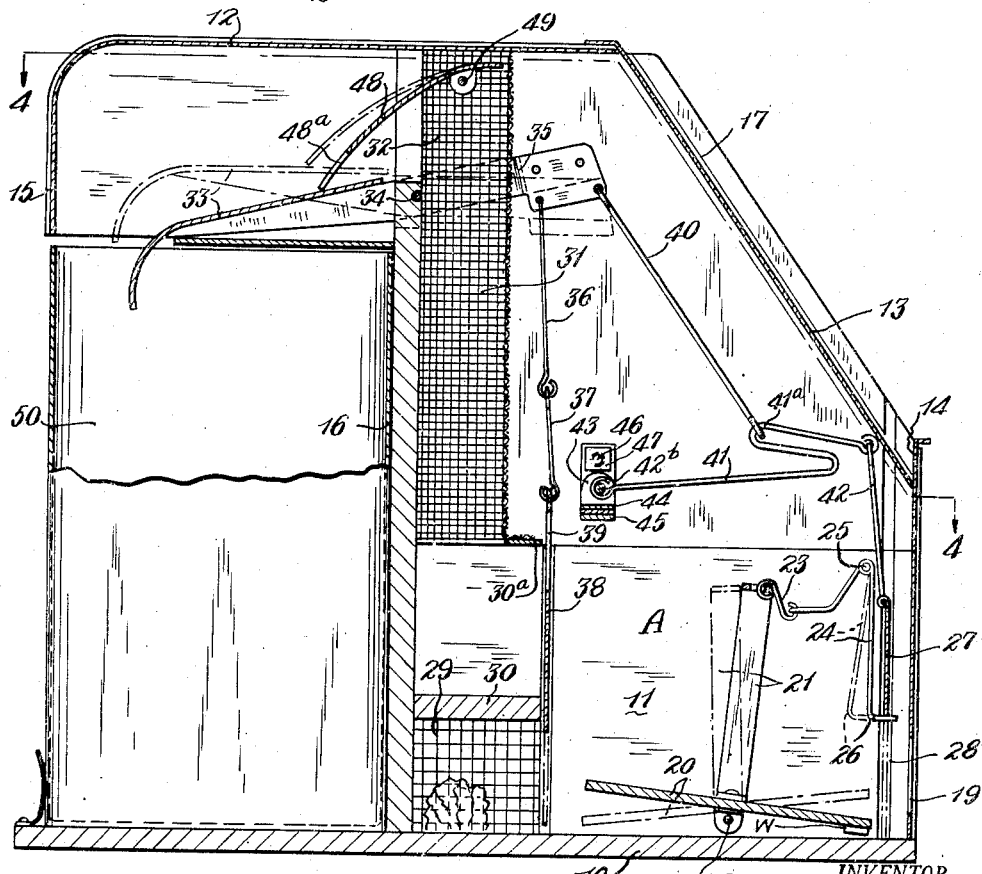
Figure 4:
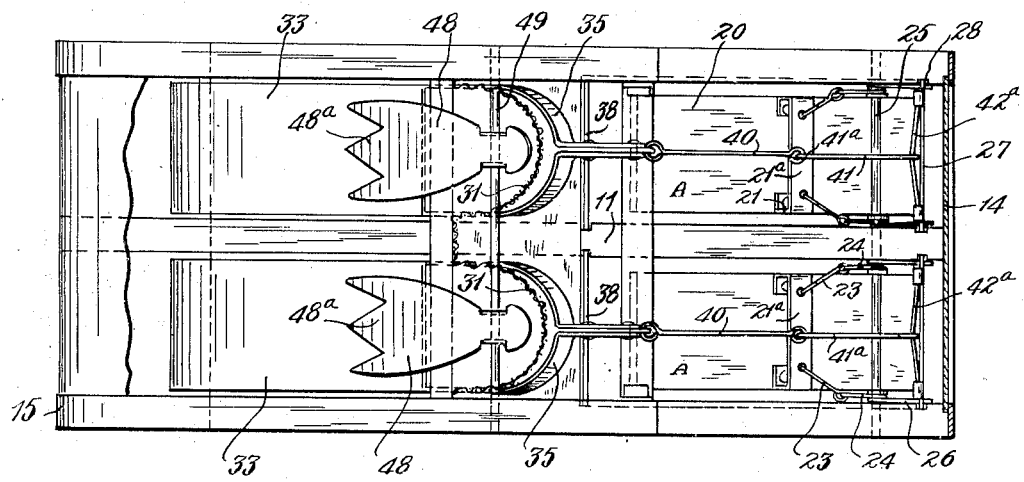
Figure 3:
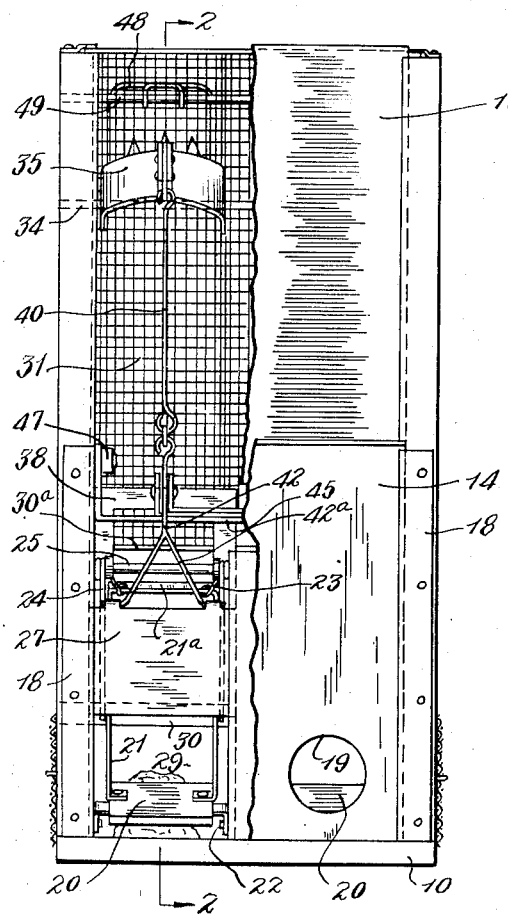

I accomplish the foregoing general objects and other and more limited objects in and through the construction and arrangement of parts shown in the drawings hereof, wherein Fig. 1 represents a perspective view of a duplex trap constructed in accordance with my invention; Fig. 2 a sectional elevation corresponding approximately to the line 2—2 of Fig. 3; Fig. 3 is a front elevational view, with parts broken away, of the duplex trap shown in Fig. 1 and Fig. 4 a sectional view of said duplex trap taken on the line 4—4 of Fig. 2.

Describing by reference characters the various parts shown in the aforesaid drawings, 10 denotes the bottom wall, 11 opposed side walls, 12 the top wall, 13 and 14 sections of the front wall, and 15 and 16 sections of the rear wall, of a casing within and between which the operating portions of the trap are contained. The front wall section 13 is shown as downwardly inclined and as removably mounted in guides 17, while the vertical section 14 is also shown as mounted in guides 18 and is provided at its bottom with openings 19 whereby access may be had by rats or other animals to both portions of the duplex trap.

20 denotes a tiltable platform within the en-

2 trance compartment A of each of the duplex traps, the sides of each of which platforms are secured to opposite arms 21 of a yoke, the bottoms of the arms of each yoke being pivotally supported by means of a horizontal shaft 22 journaled in the side walls 11. A counterweight $w$ is shown on the front portion of the platform 20. The top member 21ª of each yoke is connected by links 23 to suitably-shaped laterally-spaced lever arms 24 pivotally connected to said links and supported by a cross bar, as indicated at 25, each of the lever arms being provided at its bottom with a projection 26, which projections are adapted, when the parts are in the full-line positions shown in Fig. 2, to be swung by gravity beneath and support the bottom of a door 27 which is slidably mounted in guides 28 on the front wall section 14.

Each of the sections of the trap is provided with a bait chamber 29 adjacent to the inner end of the platform 20. These bait chambers are made preferably from wire mesh and are located beneath a platform 30, between which and an upper transverse partition 30ª I have provided a chamber whence the rat may enter a reticulated tubular passageway 31 which is shown as extending to the top wall 12 and which is provided with an outlet 32 above a rearwardly extending platform 33, the horizontal pivot for the front portion of which is indicated at 34.

35 denotes a yoke connected with each of the platforms 33 and extending around the reticulated tubular passageway 31. A front portion of each yoke is connected by links 36 and 37 with a door 38 which, when the parts are in the full-line positions shown in Fig. 2, holds the said door elevated, thereby affording a view therebelow, of the bait within the chamber 29, to a rat entering the trap, each door, however, being provided with an opening 39, above its bottom portion, which is adapted, when the door is dropped by the platform 33 having assumed the broken-like position shown in Fig. 2, to register with the space between the platform 30 and the partition 30ª.

40 denotes a link which is connected to the front or outer end of each of the yokes 35, the lower end of each of the said links being connected by a loop at the bottom thereof with the looped portion 41ª of a recurved lifting arm 41, the front end of which is pivotally connected with the top of a lifting yoke 42, 42ª connected to the top of a door 24, and the rear end of which is mounted upon a pivot 42ᵇ shown as supported between lugs 43, carried by a plate 44 which is mounted upon a transverse support 45, the ends of said support being shown as secured to the walls 11, as by means of bolts 46 and nuts 47.

48 denotes detent plates each of which is pivotally supported above the platform 33 by a shaft 49. Each of these plates is provided on its rear end with rearwardly extending teeth 48a, and the toothed rear ends of these detent plates are normally supported by and upon their respective tiltable platforms 33.

With the parts constructed and arranged as described, it is believed that the operation will be readily understood. When the trap is first put into operation it will necessarily be set by hand and the parts will occupy the positions shown in full lines in Fig. 2. The animal enters the trap through one of the openings 19 and proceeds along the tiltable platform 20 which, for purposes of illustration, will be assumed to be the platform associated with the door 27. When he has proceeded a sufficient distance along the platform to cause the inner end of the latter to drop to the position shown in broken lines, the yoke 21 will have been moved to the position also shown in broken lines, thereby causing the supporting projections 26 to be withdrawn from beneath the door 27, whereupon the weight of the latter is sufficient to cause it to drop to closed position, and at the same time to tilt the platform 33 and its associated parts to the positions shown in broken lines in Fig. 2. This tilting of the platform 33 also causes the door 38 to descend and close the entrance to the bait chamber 29, at the same time bringing the opening 39 into registration with the space between the platform 30 and partition 30a. The animal then enters this space and climbs the tubular reticulated passageway 31 and proceeds along the platform 33 which, at this time, is in its elevated position. When his head shall have passed beyond the detent teeth 48a, the weight exerted by the animal upon the rear portion of this platform will cause the latter to assume the full-line position shown in Fig. 2, wherein it slopes downwardly toward a receptacle 50 which is of such size as to enable it to be positioned upon the bottom 10 and against the wall 16, with its top in registration with the space provided beyond the rear end of the tiltable platform. The animal, being unable to withdraw into the tubular passageway 31 because of the detent teeth is forced to proceed along the downwardly inclined platform 33 and thence into the liquid-containing receptacle 50. This operation of the tiltable platform 33 raises the doors 27 and 38 to the positions shown in full line in Fig. 2 and enables the supporting projections 26 to swing beneath the bottom of the door 27.

Having thus described by invention, what I claim is:

1. An animal trap comprising an entrance compartment having an entrance opening and a sliding door for said opening, a bait compartment at the rear of said entrance compartment and provided with an opening in the front wall thereof for exposing bait to the view of an animal, there being a platform above the said bait compartment, a sliding door the lower portion of which is adapted, when the door is lowered, to close the opening in the front of said bait compartment, the said door having an opening in the upper portion thereof, a tubular passageway extending upwardly from above the said platform and having an outlet in the rear upper portion thereof, a second platform extending rearwardly from the said outlet and means for pivotally supporting the front portion of the same for movement about a horizontal axis, link means connecting the forward portion of the second platform with both of the aforesaid doors thereby to lift the said doors by the depression of the rear portion of the second platform, and latch means for holding the first mentioned door in its elevated position.

2. An animal trap comprising an entrance compartment having an entrance opening and a sliding door for said opening, a bait compartment at the rear of the entrance compartment and having an opening in the front thereof for exposing bait to view, a platform in the said entrance compartment between the said openings and means supporting the same for pivotal movement about a horizontal axis, supporting means connected with the said platform for holding the said door in elevated position when the rear end of the platform is in its elevated position, a platform at the top of the bait compartment, a sliding door, the lower portion of which is adapted to close the opening in the front of the bait compartment, the said door being provided with an opening above the lower portion thereof, connections between the first platform and the supporting means for withdrawing the supporting means from engagement with the first mentioned door when the rear end of the first platform is depressed, a tubular passageway extending upwardly from a point above the second platform and having an outlet in the rear upper portion thereof, a third platform extending rearwardly from the said outlet and means supporting the forward portion of the third platform for movement about a horizontal axis, and connections between the front of the third platform and the said doors whereby an upward tilting of the rear portion of the third platform will permit both of the said doors to be lowered through such movement.

3. An animal trap comprising an entrance compartment having an entrance opening and a sliding door for said opening, a bait compartment at the rear of the entrance compartment and having an opening in the front thereof for exposing bait to view, a platform in the said entrance compartment between the said openings and means supporting the same for pivotal movement about a horizontal axis, supporting means connected with the said platform for holding the said door in elevated position when the rear end of the platform is in its elevated position, a platform at the top of the bait compartment, a sliding door the lower portion of which is adapted to close the opening in the front of the bait compartment, the said door being provided with an opening above the lower portion thereof, connections between the first platform and the supporting means for withdrawing the supporting means from engagement with the first mentioned door when the rear end of the first platform is depressed, a tubular passageway extending upwardly from a point above the second platform and having an outlet in the rear upper portion thereof, a third platform extending rearwardly from the said outlet and means supporting the forward portion of the third platform for movement about a horizontal axis, connections between the front of the third platform and the said doors whereby an upward tilting of the rear portion of the third platform will permit both of the said doors to be lowered through such movement, and a detent plate pivotally supported above the second tiltable platform and having its rear end normally resting upon the said platform.

4. In the animal trap set forth in claim 2, the means for supporting the first mentioned door in elevated position comprising yoke arms extending upwardly from the pivotally-supported portion of the first platform, a transverse member connecting the tops of the yoke arms, laterally-spaced lever arms each having a depending leg provided with a projection at the bottom thereof and means for pivotally supporting each of said lever arms, and links connected with the top member of said yoke and to the said lever arms, respectively.

5. In the trap recited in claim 1, the means for elevating the said doors comprising a yoke connected to the front portion of the second platform and surrounding the tubular passageway, a yoke having its lower end connected to the top of the first door, a lifting arm having its front end connected with the top of the second mentioned yoke and having its rear end pivotally supported at a point remote from the front of the casing, a link connected at its upper end to the yoke connected to the second platform and at its lower end to the said lifting arm, and a link connection between the said yoke connected to the second platform and the top of the second door.

6. An animal trap comprising an entrance compartment having an entrance opening and a sliding door for said opening, a bait compartment at the rear of said entrance compartment and provided with an opening in the front wall thereof for exposing bait to the view of an animal, there being a platform above the said bait compartment, a sliding door the lower portion of which is adapted, when the door is lowered, to close the opening in the front of said bait compartment, the said door having an opening in the upper portion thereof, a passageway extending upwardly from above the said platform and having an outlet in the upper portion thereof, pivotal means positioned in the outlet and connected with both of the aforesaid doors thereby to lift the said doors by the pivotal movement of such means, and latch means for holding the first mentioned door in its elevated position.

CARLO GROSSI.

REFERENCES CITED

The following references are of record in the file of this patent:

UNITED STATES PATENTS

| Number | Name | Date |
|---|---|---|
| 638,476 | Ruckersberg | Dec. 5, 1899 |
| 1,527,373 | Nass et al. | Feb. 24, 1925 |